CONVERTOR MECHANISM FOR ROTARY-LINEAR MOTIONS

Original Filed Dec. 20, 1965 2 Sheets-Sheet 1

INVENTOR.
Robert P. Carroll,
BY Parker & Carter
Attorneys.

CONVERTOR MECHANISM FOR ROTARY-LINEAR MOTIONS

Original Filed Dec. 20, 1965 2 Sheets-Sheet 2

INVENTOR.
Robert P. Carroll,
BY Parker & Carter
Attorneys.

United States Patent Office

Re. 26,968
Reissued Oct. 13, 1970

26,968
CONVERTOR MECHANISM FOR ROTARY-LINEAR MOTIONS

Robert P. Carroll, 1315 E. Randolph Court, Milwaukee, Wis. 53212

Original No. 3,390,584, dated July 2, 1968, Ser. No. 514,790, Dec. 20, 1965. Application for reissue Jan. 31, 1969, Ser. No. 802,285
Int. Cl. F16h *21/02*
U.S. Cl. 74—99 26 Claims

Matter enclosed in heavy brackets [ ] appears in the original patent but forms no part of this reissue specification; matter printed in italics indicates the additions made by reissue.

ABSTRACT OF THE DISCLOSURE

A mechanism for converting linear motion into rotary motion and rotary motion into linear motion including a plurality of links pivotally connected together to form a foldable polygonal structure with each link pivotally connected to two other of the links of the polygonal structure. A first one of the links is pivotally connected to a support structure and a second link located opposite to the first link has a pivotal mounting which is slidable along a defined linear path. The alignment of the pivotal support of the first link and the path of movement of the pivotal mounting of the second link is such that rotation of the first link will bring about linear movement of the pivotal mounting of the second link and linear movement of the pivotal mounting of the second link along the defined path will bring about rotation of the first link. A source of linearly applied power such as a hydraulic cylinder or solenoid is connected to the pivotal connection of the second link to move it along the defined linear path.

This invention is concerned with a mechanism for converting linear motion into rotary motion and rotary motion into linear motion. It is particularly concerned with a mechanism for converting small linear motions into comparatively large rotary motions and for converting comparatively large rotary motions into small linear motions.

An object of this invention is a simple mechanism for converting the linear motions produced by electrical solenoids and fluid cylinders into rotary motions.

Another object is a simple mechanism for converting the linear forces produced by electrical solenoids and hydraulic cylinders into torques.

Another object is a mechanism for converting a small torque exerted over a large arc into a large linear force exerted over a small distance for use in clamping and braking.

Another object is a linear motion to rotary motion converting mechanism in which the degree of amplification of the linear to rotary motion can be easily adjusted.

Other objects will be found in the following specification, claims and drawings.

The invention is illustrated more or less diagrammatically in the following drawings wherein.

Figure 1:
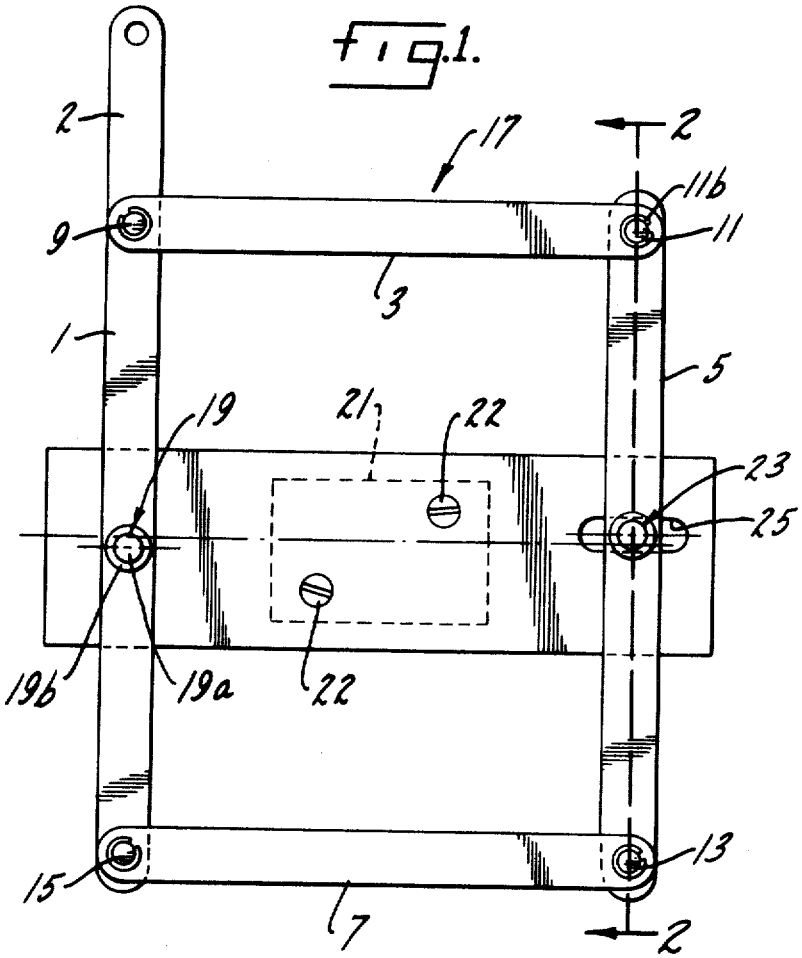
FIGURE 1 is a plan view of a mechanism embodying the features of this invention.
Figure 2:
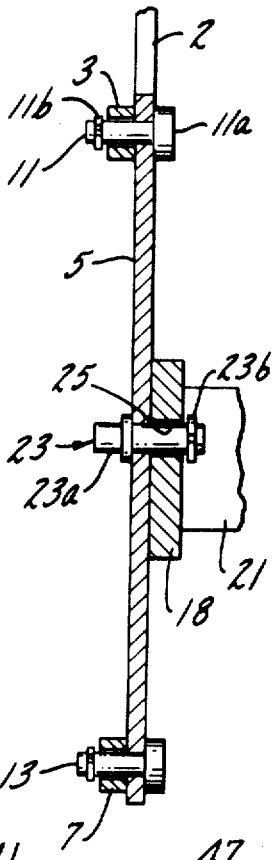
FIGURE 2 is a cross-sectional view taken along line 2—2 of FIGURE 1.

A mechanism constructed in accordance with the teachings of this invention and adaptable to convert a linear motion of small magnitude into a rotary motion of large magnitude and a large rotary motion into a small linear motion is shown in the drawings. The preferred form of the mechanism, as shown in FIGURES 1 and 2, includes links 1, 3, 5 and 7 which are pivotally connected at 9, 11, 13 and 15 to form a foldable polygonal structure 17. Link 1 may extend beyond pivotal connection 9 to form an actuation handle 2. A typical pivotal connection, for example pivotal connection 11, may included a headed pin 11a and a locking ring 11b. This polygonal structure may be mounted on a support 18 by means of a pivotal mounting means 19 which attaches to the link 1 intermediate pivotal connections 9 and 15 of said link. The pivotal mounting means 19 may take many forms, but in this example is shown as including a headed pin 19a which extends through an opening (not shown) in link 1 and is held in position by a locking ring 19b. The support 18 may be fastened to a structure 21 by means of fasteners such as screws 22. The structure 21 may be a wall of a housing, machine, etc.

A pivotal mounting means 23 may be attached to the link 5 intermediate its pivotal connections 11 and 13. The pivotal mounting means 23 may also take many forms, but in this example includes a headed pin 23a held in position by a locking ring 23b. This pivotal mounting means may be guided for linear movement in a slot 25 formed in the support 18.

The pivotal mounting means 19 of the link 1 is located off-center relative to its pivotal connections 9 and 15, that is to say the pivotal mounting means 19 is not located exactly midway between these pivotal connections, but is located closer to pivotal connection 15 than to connection 9. Also, the pivotal mounting means 23 of the link 5 is not located midway between its pivotal connections 11 and 13, but is located closer to pivotal connection 11 than to connection 13. Thus, the pivotal mountings 19 and 23 are located on opposite sides of a center line extending through the polygonal structure 17 and located parallel to straight lines joining pivotal connections 9 and 11 and 13 and 15, respectively.

With the pivotal mountings of links 1 and 5 arranged in the manner described above, linear movement of the pivotal mounting means 23 of link 5 to the right, as seen in FIGURE 1, will cause rotation of the link 1 and handle 2 in a clockwise direction about the fixed pivotal mounting means 19. Also, rotation of the link 1 and handle 2 about its pivotal mounting means 19 in a clockwise direction will move the pivotal mounting means 23 of link 5 to the right a small distance. Conversely, opposite linear movement of the pivotal mounting means 23 will cause rotation of the link 1 and handle 2 in the counterclockwise direction, as seen in FIGURE 1. With the folding polygonal structure shown in FIGURE 1, a linear motion applied to pivotal mounting means 23 can be converted into a rotary motion of pivotal mounting means 19, link 1 and handle 2 and a rotary motion applied to means 19 through handle 2 can be converted into a linear motion of means 23.

Although, in the structure of FIGURE 1, both pivotal mounting means 19 and pivotal mounting means 23 are shown and described as located off-center relative to the pivotal connections of their respective links, it should also be understood that the mechanism will convert linear to rotary motion when only one of these pivotal mounting means is located off-center relative to the pivotal connections of its links, that is, when, in the case of a foldable polygonal structure which is generally rectangular in its unfolded condition, a line joining the pivotal mounting means 19 and 23 is not parallel to straight lines joining the pivotal connections 9 and 11 and 13 and 15, respectively. It should also be realized that although reference is made to the structure being generally rectangular in shape when unfolded, this actually means that the pivotal connections 9, 11, 13 and 15 of the links are arranged in a rectangular configuration when the structure is in its unfolded position since it is readily apparent that the links could be other than straight as long as the pivotal connections between them are arranged in a generally rectangular pattern.

Figure 3:
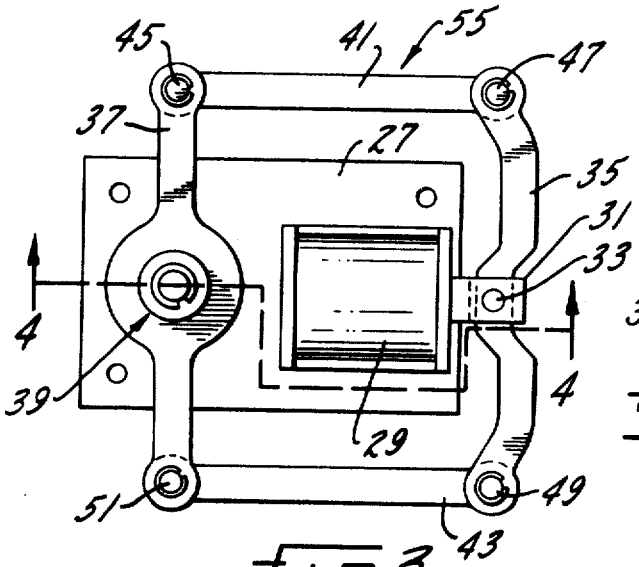
FIGURE 3 is a plan view showing one form of the invention adapted to utilize a hydraulic cylinder.
Figure 4:
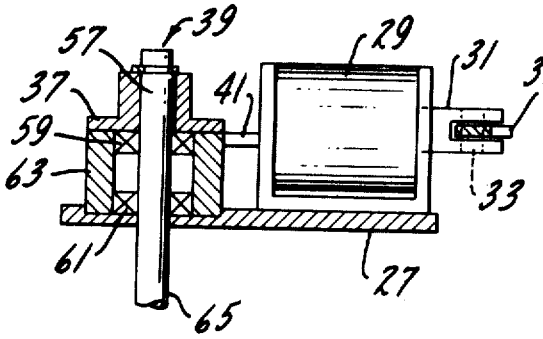
FIGURE 4 is a cross-sectional view taken along line 4—4 of FIGURE 3.
Figure 5:
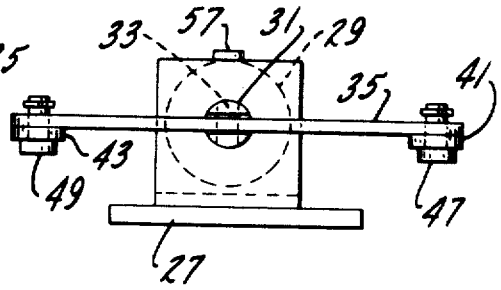
FIGURE 5 is an end view of the structure of FIGURE 3.

FIGURES 3, 4 and 5 show the adaptation of a hydraulic cylinder to a mechanism similar to that of FIGURE 1 with the cylinder being used to provide guiding linear movement to the slidable pivotal mounting means of one of the links. This adaptation includes a support 27 on which is mounted a hydraulic cylinder 29 having a piston rod 31 which is pivotally connected at 33 to a link 35. Another link 37 is pivotally mounted at 39 on the support 27. Links 35 and 37 are connected by links 41 and 43 at pivotal connections 45, 47, 49 and 51 to form a foldable polygonal structure 55. The mechanism of FIGURES 3, 4 and 5 differs slightly from the mechanism of FIGURE 1 although it utilizes the same principle of operation. The pivotal mounting of link 37 to the support 27 is located midway between the pivotal connections 45 and 51 of this link to links 41 and 43 rather than being located off-center as is the pivotal mounting 19 in the structure of FIGURE 1. However, the pivotal connection 33 between the piston rod 31 and the link 35 is located off-center relative to the pivotal connections 47 and 49 of this link to the links 41 and 43. It should be noted in FIGURE 3 that the pivotal connection 33 is closer to the pivotal connection 49 than it is to the pivotal connection 47. In order to utilize the rotational motion obtained from this mechanism, the fixed pivotal connection 39 of link 37 may include a shaft 57 mounted in bearings 59 and 61 positioned in an upstanding collar 63 formed on the support plate 27 with the shaft extending through the plate to provide a stub portion 65 to be used as a take-off for the torque. Spring means (not shown) may be provided as a return means for the link 37 after release of pressure in the hydraulic cylinder.

Figure 9:
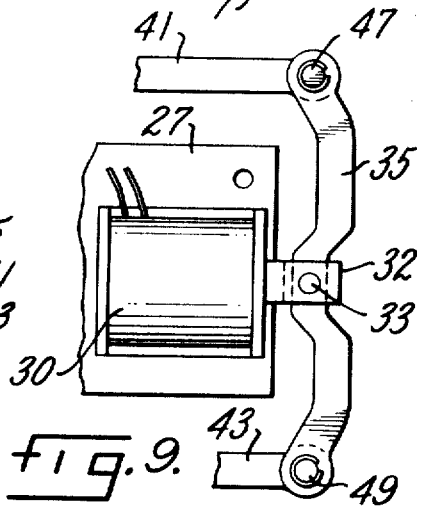
FIGURE 9 is a partial plan view showing one form of the invention adapted to utilize an electric solenoid.

FIGURE 9 shows the adaptation of a solenoid 30 to the link structure of the type shown in FIGURES 3, 4 and 5. The solenoid 30, which is used in lieu of the hydraulic cylinder 29, has an armature 32 which is pivotally connected at 33 to the link 35. The remaining parts of the mechanism are similar to those shown in the embodiment of FIGURES 3, 4 and 5. Upon energization of the solenoid, the armature 32 will move inwardly thereof to move the pivotal connection 35 to the left as viewed in FIGURE 9.

Figure 6:
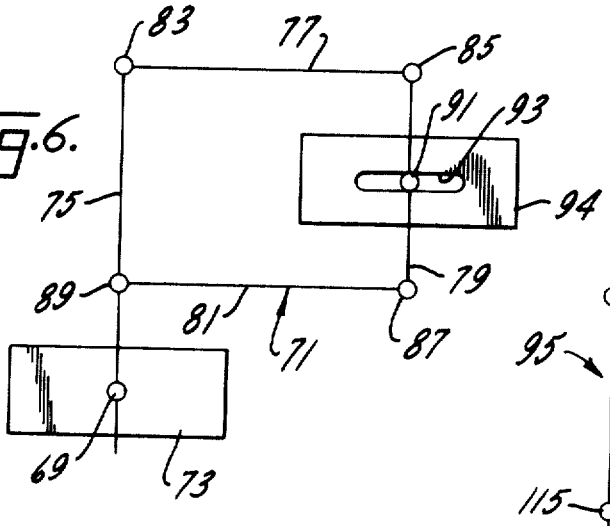
FIGURE 6 is a diagrammatic view showing a modified form of the invention.
Figure 7:
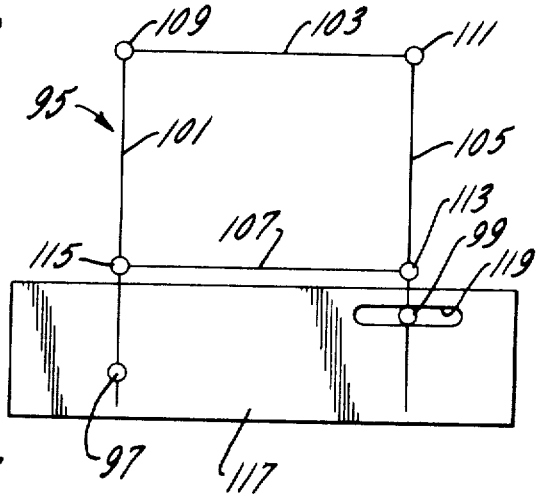
FIGURE 7 is a diagrammatic view showing another modified form of the invention.
Figure 8:
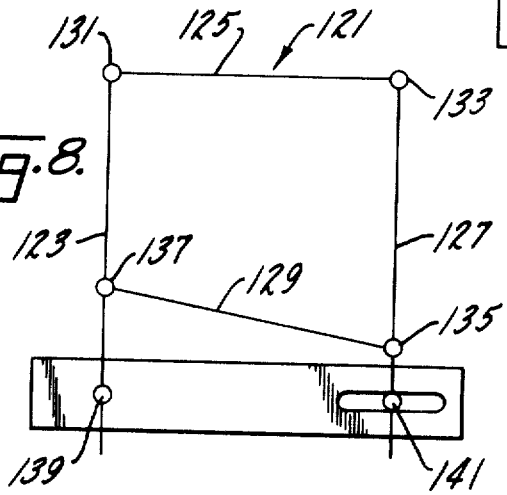
FIGURE 8 is a diagrammatic view showing yet another modified form of the invention.

In the modified forms of the foldable polygonal structure shown in FIGURES 6, 7 and 8, one or both of the pivotal mounting means may be connected to the links outside of the polygonal configuration formed by the pivotal connections between the links. For example, in FIGURE 6, the fixed pivotal mounting means 69 attaching foldable polygonal structure 71 to support 73 is attached to link 75 outwardly of the polygonal configuration formed by the pivotal connections 83, 85, 87 and 89 of the links 75, 77, 79 and 81. A slidable pivotal mounting means 91 is attached to link 79 intermediate the pivotal connections 85 and 87 of this link. The pivotal mounting means 91 is guided for linear movement in a slot 93 which is formed in a support 94.

In the foldable polygonal structure 95 shown in FIGURE 7, the pivotal mounting means 97 and 99 are both located outside of the rectangular configuration formed by the links 101, 103, 105 and 107. In this modification, the distances between the fixed pivotal mounting means 97 and the pivotal connections 109 and 115 of its link are different than the distances between the slidable pivotal mounting means 99 and the pivotal connections 113 and 111 of its link. The fixed pivotal mounting means 97 may be attached to a support 117 and the slidable pivotal mounting means 99 may be guided for movement in a slot 119 formed in this support.

In the foldable polygonal structure 121 shown in FIGURE 8, the links 123, 125, 127 and 129 are joined together by pivotal connections 131, 133, 135, and 137 which are arranged in a trapezoidal pattern. The fixed pivotal mounting means 139 for this structure is connected to link 123 outwardly of the pivotal connections as is the slidable pivotal mounting means 141, but, in this instance, due to the trapezoidal pattern of the pivotal connections, the distances between the fixed pivotal mounting means 139 and the pivotal connections 131 and 137 of its link differ from the distances between the slidable pivotal connection 141 and the pivotal connections 133 and 135 of its link.

The use, operation and function of this invention are as follows:

The structures shown in this application may be utilized both for the purposes of converting linear motions into rotary motions and of converting rotary motions into linear motions. Take, for example, the foldable polygonal structure 17 shown in FIGURE 1. Handle portion 2 of link 1 of this structure extends outwardly of the rectangular configuration formed by the links when the structure is in its unfolded position. A force exerted on this handle 1 to turn it in a clockwise direction about fixed pivotal mounting 19 as seen in FIGURE 1, will cause folding of the structure and linear movement of the pivotal mounting means 23 of the opposite link 5 of this structure. Due to the geometry of this structure, as previously described, clockwise rotation of the handle 2 and link 1 will bring about the linear movement of the pivotal mounting 23 in a righthand direction as seen in FIGURE 1 with the mounting guided in the slot 25. A rotation of the handle 2 and link 1 through a 90° clockwise angle will only result in a relatively small movement of the pivotal means 23 to the right. Therefore, the application of a relatively small force to the handle portion 2 of link 1 during a rotation through an angle of approximately 90° will result in a large force applied to the pivotal means 23 through a short distance. This arrangement, therefore, can be used to advantage in braking or clamping mechanism since a small torque is converted into a large linear force. Rotation of the link 1 about the fixed pivotal connection 19 in a counter-clockwise direction as seen in FIGURE 1 will bring about linear movement of the pivotal means 23 of link 5 in a direction to the left as seen in this figure.

Conversely, the application of a linear force to the pivotal means 23 of link 5 will bring about a rotation of the handle 2 and link 1 about the pivotal means 19. For example, a linear force applied to the pivotal means 23 in a direction extending towards the right in FIGURE 1 will cause a clockwise rotation of link 1 and handle 2. A force applied to pivotal mounting means 23 to move it in the lefthand direction in FIGURE 1 will bring about a counter-clockwise rotation of link 1 about its fixed pivotal support means 19. Due to the location of the pivotal mounting means 19 and 23 relative to the pivotal connections 9, 11, 13 and 15 of the links, a small movement of the pivotal means 23 will cause a large rotation of the handle 2 and link 1.

The mechanism shown in FIGURES 3, 4 and 5 utilizes a hydraulic cylinder 29 to provide the force to move the slidable pivotal mounting means 33 of link 35. The pivotal mounting means is connected to the piston rod 31 of the hydraulic cylinder. The piston rod can move only in a straight line and, therefore, the need for a slot to guide the pivotal mounting means is eliminated. The hydraulic cylinder is arranged so that actuation of the cylinder will move the pivotal mounting means 33 to the right as seen in FIGURE 3. Movement of the pivotal mounting means 33 to the right will result in counter-clockwise rotation of the link 37 about its fixed pivotal connection 39. Rotation of the link 37 will also result in rotation of the stub portion 65 of the shaft 57 of the fixed pivotal connection. Means to utilize the rotation of this stub portion 65 may be attached thereto, but for purposes of clarity, are not shown or described in this application. Because of the geometry of structure 55, a large force exerted by the hydraulic cylinder causes a small linear movement of the pivotal mounting means 33 and a large rotation of the link 37. It should be understood that although a hydraulic cylinder 29 is depicted as the power source for moving slidable pivotal mounting means 33, other linear power sources such as electrically operated solenoids, one type of which is shown in FIGURE 9, gear or cam arrangements could also be substituted for the hydraulic cylinder. The hydraulic cylinder could also be arranged to operate in the opposite manner and to bring about movement of the pivotal mounting means 33 to the left as seen in the figures. For the reasons previously explained this would bring about the clockwise rotation of the link 37.

In the modification of the mechanism shown in FIGURE 6, a force exerted on pivotal mounting means 91 causing it to move in slot 93 in a direction to the right will bring about a clockwise rotation of the link 75 about fixed pivotal mounting means 69. Also, linear movement of the pivotal mounting means 91 to the left in slot 93 will bring about a counter-clockwise rotation of the link 75 about its fixed pivotal mounting means 69.

In the structure of FIGURE 7, a movement of the pivotal mounting means 99 to the right, as seen in FIGURE 7, will bring about a clockwise rotation of link 101 about its fixed pivotal mounting means 97 and a movement to the left of pivotal mounting means 99 will bring about a counter-clockwise rotation of link 101 about pivotal mounting means 97. Also, in the strucure shown in FIGURE 8, movement of the slidable pivotal mounting means 141 to the right as seen in this drawing will bring about a clockwise rotation of the link 123 about its fixed pivotal mounting means 139 and movement of the pivotal mounting means to the left will bring about counter-clockwise rotation of the link 123.

The form of the invention shown in FIGURES 1 and 3 is preferred because, among other reasons, it is the easiest in which to adjust the amplitude of rotation of the link 1 for a given linear movement of the pivotal mounting means 23. The degree of rotation of the link 1 for a given linear motion of pivotal mounting means 23 depends on the distance between the pivotal mounting means 23 and the pivotal mounting means 19 in a direction generally at right angles to the direction of linear movement of pivotal means 23. The greater the distance along this line between the pivotal mounting means, the smaller will be the amount of rotation of link 1 for a given linear movement of 23. Conversely, the shorter the distance between these two mounting means on a line at right angles to the line of movement of mounting means 23, the greater will be the angular movement of link 1 for a given amount of movement of mounting means 23. This amount of amplification approaches a maximum as the distance between these mounting means approaches zero. At zero distance there is no linear movement of pivotal mounting means 23 for a given amount of rotation of link 1.

The amount of amplification in the structures shown in FIGURES 6 and 7 also depends on the distance between the fixed pivotal mounting means and the slidable pivotal mounting means in a direction generally at right angles to the direction of linear movement of the sliding pivotal mounting means. In FIGURE 6, the distance is measured at right angles to the path of slidable pivotal mounting means 91 and is the distance between this path and the fixed pivotal mounting means 69. As this distance approaches zero, the degree of amplification increases. In the structure of FIGURE 7, the same rule applies. As the distance measured at right angles to the direction of movement of slidable pivotal mounting means 99 in slot 119 between said mounting means and the fixed pivotal mounting means 97 decreases in its approach to zero, the amount of amplification of rotation of link 101 for each unit of movement of pivotal mounting means 99 increases.

In the structures of FIGURES 1, 3, 6, 7, 8 and 9 the direction of rotation of the link to which the fixed pivotal mounting means is attached can be reversed for a linear movement of the sliding pivotal mounting means in a given direction by moving the sliding pivotal mounting means to the opposite side of the polygonal structure relative to fixed mounting means. For example, in the structure of FIGURE 1, the fixed pivotal mounting means 19 is located closer to the link 7 than is the slidable mounting means 23. If the fixed pivotal mounting means 19 were moved in the direction of link 3 and the slidable pivotal mounting means 23 was moved in the direction of link 7 so that mounting means 23 were closer to link 7 than was the pivotal mounting means 19, then linear movement of the pivotal mounting means 23 to the right would bring about counter-clockwise rotation of link 1. The direction of rotation of the link in the other structures relative to the direction of linear movement of the slidable pivotal mounting means can be adjusted in the same manner.

I claim:

[1. A mechanism for converting linear motion into rotary motion and rotary motion into linear motion, including:

a support, a plurality of links pivotally connected together to form a foldable polygonal structure with each link pivotally connected to two other of said links, a first of said links being pivotally mounted on said support with said pivotal mounting being fixed to the support, a second of said links being located on the opposite side of said polygonal structure from said first link when said structure is in its unfolded condition and having a pivotal mounting means guided for linear movement along a defined path, said pivotal mounting of said first link and said pivotal mounting of said second link being positioned relative to each other and to the pivotal connections of their respective links so that linear movement of the pivotal mounting means of said second link along said defined path will result in rotation of the pivotal mounting of said first link and rotation of the pivotal mounting of said first link will bring about linear movement of the pivotal mounting of said second link along said defined path with said pivotal mounting means of said first link formed and adapted to be connectable to means to rotate it and be rotated by it and said pivotal mounting means of said second link formed and adapted to be connectable to means to move it linearly and be moved linearly by it.]

[2. The structure of claim 1 further characterized in that the pivotal connections of said links form a generally rectangular configuration when said structure is in its unfolded position.]

[3. The structure of claim 1 further characterized in that means are provided to move the pivotal mounting means of said second link along said defined path and means are associated with the pivotal mounting of said first link to be rotated upon rotation of said first link.]

[4. The structure of claim 1 further characterized in that means are provided to rotate said first link about its pivotal mounting and means are associated with the pivotal mounting of said second link to be moved linearly upon linear movement of said pivotal mounting.]

[5. The structure of claim 1 further characterized in that the location of the pivotal mountings of said first and second links relative to the pivotal connections of their respective links are arranged so that at least one of said pivotal mountings is spaced a different distance from one of the pivotal connections of its link than from the other pivotal connection of its link and a straight line joining said pivotal mountings is not parallel to straight lines extending between similar pivotal connections of the first and second links.]

[6. The structure of claim 1 further characterized in that said structure comprises four links arranged in the form of a polygon when in its unfolded condition.]

[7. The structure of claim 1 further characterized in that said first and second links are of generally straight construction and are aligned generally parallel to one another when said structure is unfolded.]

[8. The structure of claim 1 further characterized in that said pivotal mounting of said first link is located exactly halfway between the pivotal connections of said first link.]

[9. The structure of claim 1 further characterized in that said pivotal mounting means are positioned relative to the pivotal connections of their respective links such that the distances between the fixed pivotal mounting means and the pivotal connections of its link are not identical in length and orientation to the distances between the linearly movable pivot mounting means and the pivotal connections of its link.]

[10. The structure of claim 2 further characterized in that the pivotal mounting of said first link is located midway between the pivotal connections of said link and the pivotal mounting of said second link is located closer to one of the pivotal connections of said second link than to the other pivotal connection of this link.]

[11. The structure of claim 2 further characterized in that the pivotal mounting of said first link is located outside of the pivotal connections of said link and the pivotal mounting of said second link is located between the pivotal connections of said second link.]

[12. The structure of claim 2 further characterized in that the pivotal mounting of said first link is located outside of the pivotal connections of said link and the pivotal mounting of said second link is located outside of the pivotal connections of said second link on the same side of said polygonal structure as the pivotal mounting of said first link but closer to said structure.]

[13. The structure of claim 1 further characterized in that the pivotal mountings of said first and second links are located outside of the structure formed by said pivotal connections with one of said pivotal mountings being located closer to one of its pivotal connections and then the other pivotal mounting is located relative to one of its pivotal connections.]

[14. The structure of claim 3 further characterized in that a hydraulic cylinder is utilized to move the pivotal mounting of said second link along said defined path.]

[15. The structure of claim 3 further characterized in that an electrically operated solenoid is utilized to move the pivotal mounting means of said second link along said defined path.]

*16. A mechanism for converting linear motion into rotary motion and rotary motion into linear motion, including:*

*a support,*

*a plurality of links pivotally connected together to form a foldable polygonal structure with each link pivotally connected to two other of said links,*

*a first of said links being pivotally mounted on said support with said pivotal mounting being fixed to the support,*

*a second of said links being located on the opposite side of said polygonal structure from said first link when said structure is in its unfolded condition and having a pivotal mounting means guided for linear movement along a defined path,*

*said pivotal mounting of said first link and said pivotal mounting of said second link being positioned relative to each other and to the pivotal connections of their respective links so that linear movement of the pivotal mounting means of said second link along said defined path will result in rotation of the pivotal mounting of said first link and rotation of the pivotal mounting of said first link will bring about linear movement of the pivotal mounting of said second link along said defined path with said pivotal mounting means of said first link formed and adapted to be connectable to means to rotate it and be rotated by it and said pivotal mounting means of said second link formed and adapted to be connectable to means to move it linearly and be moved linearly by it,*

*the location of the pivotal mountings of said first and second links relative to the pivotal connections of their respective links being arranged so that at least one of said pivotal mountings is spaced a different distance from one of the pivotal connections of its link than from the other pivotal connection of its link and a straight line joining said pivotal mountings is not parallel to straight lines extending between similar pivotal connections of the first and second links.*

*17. The structure of claim 16 further characterized in that the pivotal connections of said links form a generally rectangular configuration when said structure is in its unfolded position.*

*18. The structure of claim 16 further characterized in that means are provided to move the pivotal mounting means of said second link along said defined path and means are associated with the pivotal mounting of said first link to be rotated upon rotation of said first link.*

*19. The structure of claim 16 further characterized in that means are provided to rotate said first link about its pivotal mounting and means are associated with the pivotal mounting of said second link to be moved linearly upon linear movement of said pivotal mounting.*

*20. The structure of claim 16 further characterized in that said structure comprises four links arranged in the form of a polygon when in its unfolded condition.*

*21. The structure of claim 16 further characterized in that said first and second links are of generally straight construction and are aligned generally parallel to one another when said structure is unfolded.*

*22. The structure of claim 16 further characterized in that said pivotal mounting of said first link is located exactly halfway between the pivotal connections of said first link.*

*23. The structure of claim 16 further characterized in that said pivotal mounting means are positioned relative to the pivotal connections of their respective links such that the distances between the fixed pivotal mounting means and the pivotal connections of its link are not identical in length and orientation to the distances between the linearly movable pivot mounting means and the pivotal connections of its link.*

*24. The structure of claim 17 further characterized in that the pivotal mounting of said first link is located midway between the pivotal connections of said link and the pivotal mounting of said second link is located closer to one of the pivotal connections of said second link than to the other pivotal connection of his link.*

*25. The structure of claim 17 further characterized in that the pivotal mounting of said first link is located outside of the pivotal connections of said link and the pivotal mounting of said second link is located between the pivotal connections of said second link.*

*26. The structure of claim 17 further characterized in that the pivotal mounting of said first link is located outside of the pivotal connections of said link and the*

*pivotal mounting of said second link is located outside of the pivotal connections of said second link on the same side of said polygonal structure as the pivotal mounting of said first link but closer to said structure.*

*27. The structure of claim 16 further characterized in that the pivotal mountings of said first and second links are located outside of the structure formed by said pivotal connections with one of said pivotal mountings being located closer to one of its pivotal connections than the other pivotal mounting is located relative to one of its pivotal connections.*

*28. The structure of claim 18 further characterized in that a hydraulic cylinder is utilized to move the pivotal mounting of said second link along said defined path.*

*29. The structure of claim 18 further characterized in that an electrically operated solenoid is utilized to move the pivotal mounting means of said second link along said defined path.*

*30. A mechanism for converting motion along a defined path into rotary motion and rotary motion along a defined path, including:*

*a support,*

*a plurality of links pivotally connected together to form a foldable polygonal structure with each link pivotally connected to two other of said links,*

*a first of said links being pivotally mounted on said support with said pivotal mounting being fixed to the support,*

*a second of said links being located on the opposite side of said polygonal structure from said first link when said structure is in its unfolded condition and having a pivotal mounting means guided for movement along a defined path,*

*said pivotal mounting of said first link and said pivotal mounting of said second link being positioned relative to each other and to the pivotal connections of their respective links so that movement of the pivotal mounting means of said second link along said defined path will result in rotation of the pivotal mounting of said first link and rotation of the pivotal mounting of said first link will bring about movement of the pivotal mounting of said second link along said defined path with said pivotal mounting means of said first link formed and adapted to be connectable to means to rotate it and be rotated by it and said pivotal mounting means of said second link formed and adapted to be connectable to means to move it along said defined path and to be moved along said defined path by it,*

*the locations of the pivotal mountings of said first and second links relative to the pivotal connections of their respective links being arranged so that at least one of said pivotal mountings is spaced a different distance from one of the pivotal connections of its link than from the outer pivotal connection of its link and a straight line joining said pivotal mountings is not parallel to straight lines extending between similar pivotal connections of the first and second links.*

*31. The structure of claim 30 further characterized in that the pivotal connections of said links form a generally rectangular configuration when said structure is in its unfolded position.*

*32. The structure of claim 30 further characterized in that means are provided to move the pivotal mounting means of said second link along said defined path and means are associated with the pivotal mounting of said first link to be rotated upon rotation of said first link.*

*33. The structure of claim 30 further characterized in that means are provided to rotate said first link about its pivotal mounting and means are associated with the pivotal mounting of said second link to be moved along said defined path upon movement of said pivotal mounting along said defined path.*

*34. The structure of claim 30 further characterized in that said structure comprises four links arranged in the form of a polygon when in its unfolded condition.*

*35. The structure of claim 30 further characterized in that said first and second links are of generally straight construction and are aligned generally parallel to one another when said structure is unfolded.*

*36. The structure of claim 30 further characterized in that said pivotal mounting of said first link is located exactly half-way between the pivotal connections of said first link.*

*37. The structure of claim 30 further characterized in that said pivotal mounting means are positioned relative to the pivotal connections of their respective links such that the distances between the pivotal mounting means of the first link and the pivotal connections of the first link are not identical in length and orientation to the distances between the pivotal mounting means of the second link and the pivotal connections of the second link.*

*38. The structure of claim 30 further characterized in that the pivotal mounting of said first link is located mid-way between the pivotal connections of said link and the pivotal mounting of said second link is located closer to one of the pivotal connections of said second link than to the other pivotal connection of this link.*

*39. The structure of claim 30 further characterized in that the pivotal mounting of said first link is located outside of the pivotal connections of said link and the pivotal mounting of said second link is located between the pivotal connections of said second link.*

*40. The structure of claim 30 further characterized in that the pivotal mounting of said first link is located outside of the pivotal connections of said link and the pivotal mounting of said second link is located outside of the pivotal connections of said second link on the same side of said polygonal structure as the pivotal mounting of said first link but closer to said structure.*

*41. The structure of claim 30 further characterized in that the pivotal mountings of said first and second links are located outside of the structure formed by said pivotal connections with one of said pivotal mountings being located closer to one of its pivotal connections than the other pivotal mounting is located relative to one of its pivotal connections.*

References Cited

The following references, cited by the Examiner, are of record in the patented file of this patent or the original patent.

UNITED STATES PATENTS

| | | | |
|---|---|---|---|
| 178,014 | 5/1876 | Lull | 74—99 |
| 684,167 | 10/1901 | Baker | 74—518 |
| 790,174 | 5/1905 | Bollee | 74—518 |
| 1,247,603 | 11/1917 | Ward | 74—521 |
| 3,153,286 | 10/1964 | Buisson | 74—99 |

WESLEY S. RATLIFF, JR., Primary Examiner